US008882008B1

(12) United States Patent
Viveen

(10) Patent No.: US 8,882,008 B1
(45) Date of Patent: Nov. 11, 2014

(54) DUAL SHREDDING SYSTEM FOR A MOBILE DOCUMENT SHREDDING VEHICLE AND METHOD OF USE

(76) Inventor: Peter Viveen, Cambridge (CA)

( * ) Notice: Subject to any disclaimer, the term of this patent is extended or adjusted under 35 U.S.C. 154(b) by 408 days.

(21) Appl. No.: 13/429,526

(22) Filed: Mar. 26, 2012

Related U.S. Application Data

(60) Provisional application No. 61/518,054, filed on Apr. 30, 2011.

(51) Int. Cl.
*B02C 23/02* (2006.01)

(52) U.S. Cl.
USPC ...................... 241/29; 241/186.3; 241/101.74

(58) Field of Classification Search
USPC ......... 241/152.2, 186.3, 101.74, 101.741, 29, 241/222
See application file for complete search history.

(56) References Cited

U.S. PATENT DOCUMENTS

| | | | | |
|---|---|---|---|---|
| 3,622,089 | A * | 11/1971 | Quinn | 241/75 |
| 3,670,972 | A * | 6/1972 | Quinn | 241/76 |
| 3,841,570 | A * | 10/1974 | Quinn | 241/78 |
| 5,505,390 | A * | 4/1996 | Rodgers | 241/48 |
| 2009/0041639 | A1* | 2/2009 | Vanderpool | 422/184.1 |

* cited by examiner

*Primary Examiner* — Faye Francis
(74) *Attorney, Agent, or Firm* — Ted Masters

(57) ABSTRACT

A dual shredding system for a mobile document shredding vehicle produces either coarsely shredded material or finely shredded material. Unshredded material is first coarsely shredded by a coarse shredder. In a coarse shred mode, the coarsely shredded material is routed to a shredded material storage compartment in the vehicle. In a fine shred mode, the coarsely shredded material is finely shredded by a fine shredder, and then routed to the storage compartment. The position of a gate determines whether the system is in the coarse or fine shred mode.

4 Claims, 3 Drawing Sheets

500
504
506
502
2
20
702, 704

504
502
506
20
700
22
32
26
33
27
24
34
702
702
36
702
30
28
38

20
700
22
506
702
40
PS
26
27
34
33
24
32
704
704
702
36
30
28
38

20
22
506
508
28

DUAL SHREDDING SYSTEM FOR A MOBILE DOCUMENT SHREDDING VEHICLE AND METHOD OF USE

CROSS REFERENCE TO RELATED APPLICATION

This application claims the filing benefit under 35 U.S.C. §119(e) of U.S. Provisional Application No. 61/518,054, filed Apr. 30, 2011, which is hereby incorporated by reference.

TECHNICAL FIELD

The present invention pertains generally to shredders, and more particularly to a dual shredding system for a mobile document shredding vehicle.

BACKGROUND OF THE INVENTION

Devices for shredding paper documents, plastic, and metal products as well as pre and post consumer goods are known in the art. These devices include blades, knives, or other cutting elements which cut the product into strips or fine particles, for recycling or disposal. Paper shredders are often utilized to destroy proprietary, confidential, or otherwise sensitive documents such as bank statements, tax information, user identification numbers, secret corporate information, etc. Such paper shredding devices can be integrated into a vehicle such as a truck. The mobile shredder is then driven to a customer's place of business to effect the shredding process on site.

In some shredding applications it is desirable to produce a finely shredded output which has a consistent shred size. To accomplish this in the plastics industry, some shredders use a dual shredding system which includes both coarse and fine shredders. Screens can also be used in combination with a shredder to improve shred size consistency.

BRIEF SUMMARY OF THE INVENTION

The present invention is directed to a dual paper dual shredding system for a mobile document shredding vehicle. The system can either (1) produce a small and more consistent shred size than is currently achievable, or (2) produce a higher less finely shredded throughput. The smaller and more consistent shred size results from using two shredders connected in series. Material is first shredded in a low speed high torque shredder, and then the output of the first shredder is again shredded by a second fine shredder (granulator). A greater throughput is achieved by only utilizing the low speed high torque shredder.

In accordance with an embodiment, a dual shredding system for a mobile document shredding vehicle receives unshredded material and produces either coarsely shredded material or finely shredded material. The system includes a first shredder which receives the unshredded material and produces the coarsely shredded material, and a second shredder which receives the coarsely shredded material from the first shredder and produces the finely shredded material. The system further includes a shredded material outlet, and a conveyor which moves the coarsely shredded material from the first shredder to a gate. The gate is selectively positionable (1) to a coarse shred position in which the coarsely shredded material is routed to the shredded material outlet, and (2) to a fine shred position in which the coarsely shredded material is routed to the second shredder, and after shredding by the second shredder, the finely shredded material is routed to the shredded material outlet.

In accordance with another embodiment, the second shredder is a granulator.

In accordance with another embodiment, the conveyor is an auger conveyor.

In accordance with another embodiment, the mobile document shredding vehicle has a shredded material storage compartment. The shredded material outlet is disposed adjacent to the shredded material storage compartment. A second conveyor moves the coarsely and finely shredded material from the shredded material outlet to the shredded material storage compartment.

In accordance with another embodiment, when the gate is positioned to the coarse shred position, the coarsely shredded material passes underneath the second shredder.

In accordance with another embodiment, the second shredder includes a screen which passes the finely shredded material.

In accordance with another embodiment, a plurality of different interchangeable screens pass different size finely shredded material.

In accordance with another embodiment, the mobile document shredding vehicle has a machinery compartment which houses the dual shredding system, the machinery compartment is separated from a shredded material storage compartment by a barrier wall. The screen is replaceable from the machinery compartment.

In accordance with another embodiment, a vacuum generator is disposed on an opposite side of the screen from the second shredder. The vacuum generator causes the finely shredded material to be pulled through the screen toward the shredded material outlet.

In accordance with another embodiment, the first shredder having a forward running direction to shred, and an opposite reverse running direction. The second shredder is hydraulically powered by an hydraulic power line. An hydraulic pressure sensor is connected to the hydraulic power line, the hydraulic pressure sensor measuring hydraulic pressure in the hydraulic power line when the second shredder is shredding. When the dual shredding system is operating with the gate in the fine shred position, and the hydraulic, pressure exceeds a predetermined value, for an interval of time the conveyor stops and the first shredder runs in the reverse direction. After the interval of time has elapsed, the conveyor starts again and the first shredder runs in the forward direction.

In accordance with another embodiment, the gate is a linearly translating gate which linearly moves from the coarse shred position to the fine shred position.

Other embodiments, in addition to the embodiments enumerated above, will become apparent from the following detailed description, taken in conjunction with the accompanying drawings, which illustrate, by way of example, the principles of the dual shredding system and method of use.

DETAILED DESCRIPTION OF THE INVENTION

Figure 1:
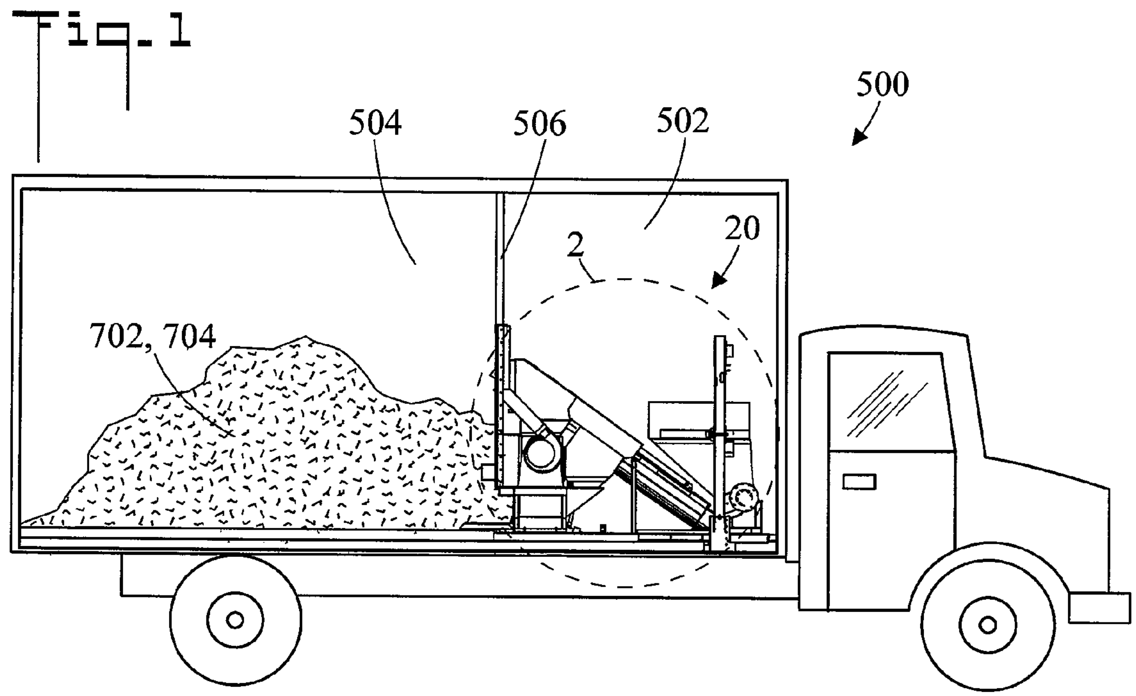
FIG. 1 is a reduced cutaway side elevation view of a mobile document shredding vehicle with a dual shredding system.
Figure 2:
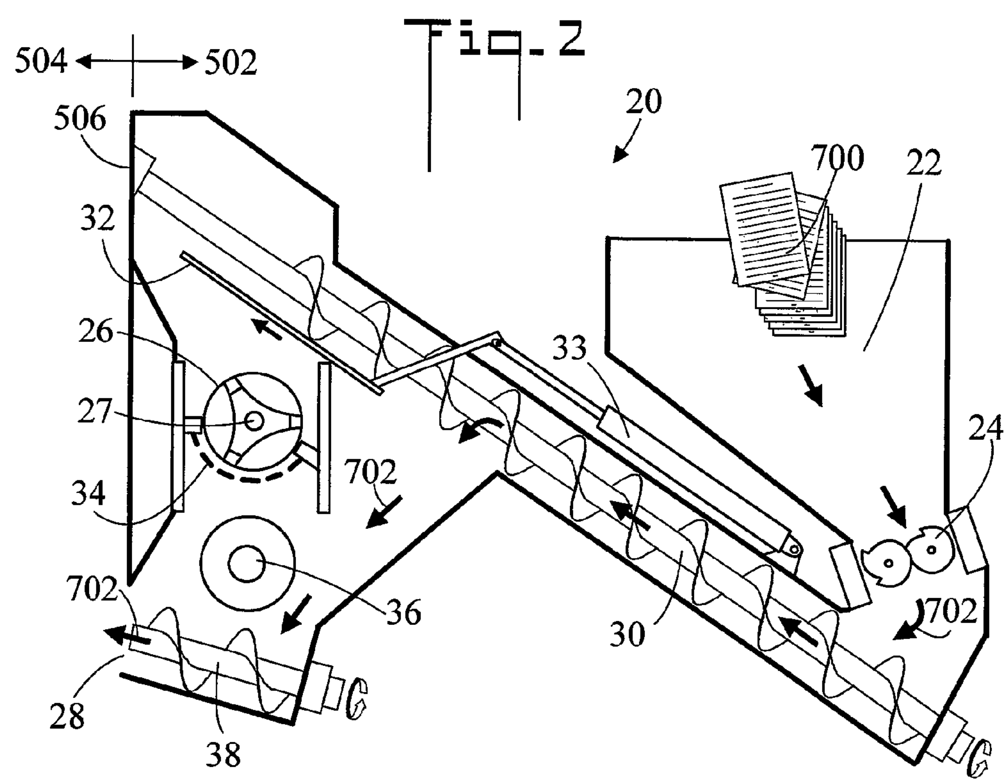
FIG. 2 is a cutaway side elevation view of area 2 of FIG. 1, showing the dual shredding system in a coarse shred mode.
Figure 3:
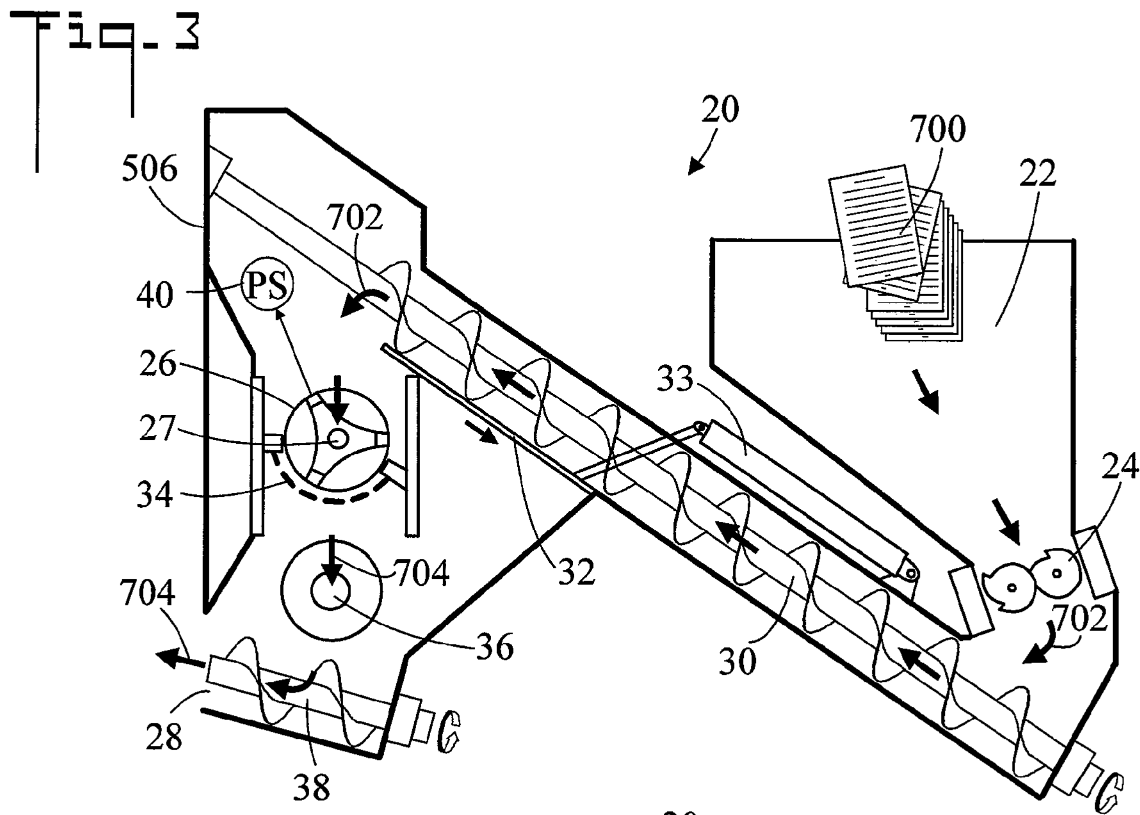
FIG. 3 is a cutaway side elevation view as in FIG. 1, showing the dual shredding system in a fine shred mode.

Referring initially to FIG. 1 there is illustrated a reduced cutaway side elevation view of a mobile document shredding vehicle 500. A dual shredding system 20 in accordance with the present invention is housed within mobile document shredding vehicle 500. FIG. 2 is a cutaway side elevation view of area 2 of FIG. 1, showing dual shredding system 20 in a coarse shred mode, and FIG. 3 is a cutaway side elevation view showing dual shredding system 20 in a fine shred mode. Mobile document shredding vehicle 500 has a machinery compartment 502 which houses dual shredding system 20, and a shredded material storage compartment 504 which stores shredded material. Machinery compartment 502 is separated from shredded material storage compartment 504 by a barrier wall 506.

Dual shredding system 20 receives unshredded material 700 in a hopper 22 and produces either coarsely shredded material 702 (FIG. 2) or finely shredded material 704 (FIG. 3). Dual shredding system 20 includes a first shredder 24 (coarse shredder) which receives unshredded material 700 (such as paper documents) and produces coarsely shredded material 702. In an embodiment first shredder 24 is a low speed high torque two shaft shredder also know as a pierce and tear shredder. A second shredder 26 (fine shredder) receives coarsely shredded material 702 and produces finely shredded material 704. As used herein, the terms "coarsely shredded material" and "finely shredded material" are relative, and mean that the size of the pieces of shredded material 702 produced by first shredder 24 is larger than the size of the pieces of shredded material 704 produced by second shredder 26. In an embodiment, second shredder 26 is a granulator which produces finely shredded material by repeated cutting until the particles are small enough to pass through the mesh of a screen.

Dual shredding system 20 has a shredded material outlet 28 through which the coarsely shredded 702 and finely shredded 704 material passes on the way to shredded material storage compartment 504. A conveyor 30 (such as a screw or auger conveyor) moves the coarsely shredded material 702 from first shredder to a gate 32. Gate 32 is selectively positionable (1) to a coarse shred position (FIG. 2) in which the coarsely shredded material 702 is routed to shredded material outlet 28 and then into shredded material storage compartment 504, and (2) to a fine shred position (FIG. 3) in which the coarsely shredded material 702 is routed to second shredder 26, and after shredding by second shredder 26, the finely shredded material 704 is routed to shredded material outlet 28, and then into shredded material storage compartment 504. In the shown embodiment gate 32 is a linearly translating gate which linearly moves from the coarse shred position (FIG. 2) to the fine shred position (FIG. 3) (as opposed to a pivoting gate). In the shown embodiment, the position of gate 32 is controlled by a hydraulic cylinder 33. It is noted that in FIG. 2, when gate 32 is positioned to the coarse shred position, coarsely shredded material 702 passes underneath second shredder 26. It is further noted that gate 32 is located directly below conveyor 30.

Second shredder 26 includes a replaceable screen 34 which passes finely shredded material 704. The size of the mesh on screen 34 determines the particle size of the finely shredded material 704 and ensures consistent particle size. A plurality of different interchangeable screens 34 pass different size finely shredded material 704. In an embodiment, screen 34 is rectangular and curved. Further, dual shredding system 20 is mechanically configured so that screen 34 is replaceable from dual shredding system machinery compartment 502. In this embodiment, second shredder 26 is horizontally turned 90° from the position shown in FIGS. 2 and 3 in order to effect removal and replacement of screen 34. In the turned position, second shredder 26 rotates about an axis 27 which is parallel to the longitudinal axis of vehicle 500 rather than perpendicular as is shown in FIGS. 2 and 3.

A vacuum generator 36 is disposed on an opposite side of screen 34 from second shredder 26. Vacuum generator 36 causes the finely shredded material 704 to be pulled through screen 34 and toward shredded material outlet 28.

Shredded material outlet 28 is disposed adjacent to shredded material storage compartment 504. A second conveyor 38 moves the coarsely and finely shredded material (702 and 704 respectively) from shredded material outlet 28 to shredded material storage compartment 504. That is, second conveyor 38, also an auger in the shown embodiment, compacts the shredded material and pushes it into shredded material storage compartment 504.

Referring to FIG. 3, first shredder 24 has a forward running direction to shred, and an opposite reverse running direction. Second shredder 26 is hydraulically powered by an hydraulic power line. A hydraulic pressure sensor 40 is connected to the hydraulic power line, hydraulic pressure sensor 40 measuring hydraulic pressure in the hydraulic power line when second shredder 26 is shredding. When dual shredding system 20 is operating with gate 32 in the fine shred position, and hydraulic pressure as measured by hydraulic pressure sensor 40 exceeds a predetermined value (threshold pressure), for an interval of time (e.g. 2 seconds) conveyor 30 stops and first shredder 24 runs in the reverse direction. After the interval of time has elapsed, conveyor 30 starts and first shredder 24 runs in the forward direction. This temporary stopping of conveyor 30 and reversal of first shredder 24 gives second shredder 26 time to clear shred material and thereby reduce the hydraulic pressure.

The start up sequence of dual shredding system 20 is (1) second conveyor 38, (2) second shredder 26, (3) conveyor 30, and (4) first shredder 24. And, for coarse shredding only, second shredder 26 is turned off. In an embodiment, all of the dual shredding system 20 equipment is driven hydraulically with the ability to vary the speeds of components. In an embodiment the speed of first shredder 24, second shredder 26, and conveyor 30 can each be selectively varied. The equipment and feed rates are controlled by a customized computer program.

Figure 4:
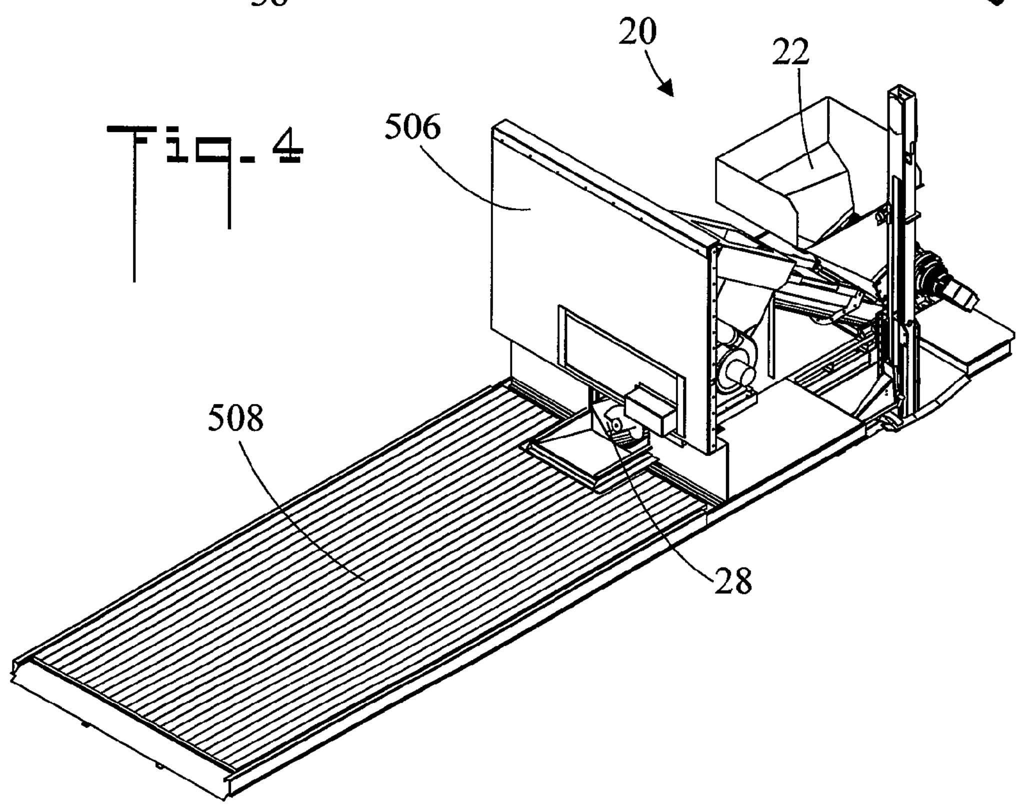
FIG. 4 is a reduced perspective view of the dual shredding system.
Figure 5:
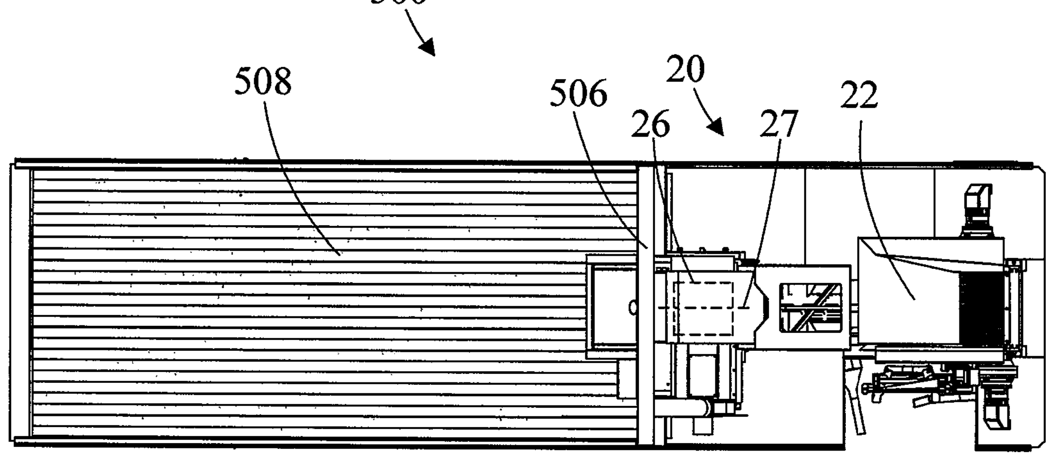
FIG. 5 is a reduced top plan view of the dual shredding system.

FIGS. 4 and 5 are reduced perspective and top plan views respectively of dual shredding system 20, showing hopper 22, shredded material outlet 28, barrier wall 506, and the bed 508 of shredded material storage compartment 504. FIG. 5 shows second shredder 26 turned 90° from the position of FIGS. 2 and 3 so that axis 27 is parallel with the longitudinal axis of vehicle 500.

In terms of use, a method for shredding material in a mobile document shredding vehicle 500 includes: (refer to FIGS. 1-5)

(a) providing a mobile document shredding vehicle 500;

(b) providing unshredded material 700;

(c) providing a dual shredding system 20 for the mobile document shredding vehicle 500, the dual shredding system 20 including;

a first shredder 24 which receives unshredded material 700 and produces coarsely shredded material 702;

a second shredder 26 which receives coarsely shredded material 702 and produces finely shredded material 704;

a shredded material outlet 28;

a conveyor 30 which moves the coarsely shredded material 702 from first shredder 24 to a gate 32;

gate 32 selectively positionable (1) to a coarse shred position in which the coarsely shredded material 702 is routed to shredded material outlet 28, and (2) to a fine shred position in which the coarsely shredded material 702 is routed to second shredder 26, and after shredding by second shredder 26, the finely shredded material 704 is routed to shredded material outlet 28;

(d) activating dual shredding system 20;

(e) positioning gate 32 to one of the coarse shred position and the fine shred position; and, (f) putting unshredded material 700 into first shredder 24.

The method further including:

in (c), second shredder 26 being a granulator.

The method further including:

in (c), conveyor 30 being an auger conveyor.

The method further including:

in (a), mobile document shredding vehicle 500 having a shredded material storage compartment 504;

in (b) shredded material outlet 28 disposed adjacent to shredded material storage compartment 504; and, in (b), a second conveyor 38 for moving coarsely 702 and finely 704 shredded material from shredded material outlet 28 to shredded material storage compartment 504.

The method further including:

in (e), when gate 32 is positioned to the coarse shred position, the coarsely shredded material 702 passing underneath second shredder 26.

The method further including:

in (c), second shredder 26 including a screen 34 which passes finely shredded material 704.

The method further including:

in (c), a plurality of different interchangeable screens 34 which pass different size finely shredded material 704;

deactivating dual shredding system 20; and, replacing screen 34 with a different screen 34 and reactivating dual shredding system 20.

The method further including:

in (a), mobile document shredding vehicle 500 having a dual shredding system machinery compartment 502 which houses dual shredding system 20, the machinery compartment 502 separated from a shredded material storage compartment 504 by a barrier wall 506, in (b), screen 34 replaceable from machinery compartment 502 (that is, screen 34 can be replaced by going into the machinery compartment 504, as opposed to having to physically go into the shredded material storage compartment 504); and, effecting the replacement of screen 34 with a different screen 34 from the machinery compartment.

The method further including:

in (c), a vacuum generator 36 disposed on an opposite side of screen 34 from second shredder 26; and, during operation vacuum generator 36 causing the finely shredded material 704 to be pulled through screen 34 toward shredded material outlet 28.

The method further including:

in (c), first shredder 24 having a forward running direction to shred, and an opposite reverse running direction;

in (c), second shredder 26 being hydraulically powered by an hydraulic power line;

in (c) an hydraulic pressure sensor 40 connected to the hydraulic power line, hydraulic pressure sensor 40 measuring hydraulic pressure in the hydraulic power line when second shredder 26 is shredding;

in (e), when dual shredding system 20 is operating with gate 32 in the fine shred position, and the hydraulic pressure exceeds a predetermined value, for an interval of time conveyor 30 stopping and first shredder 24 running in the reverse direction; and, after the interval of time has elapsed, conveyor 30 starting and first shredder 24 running in the forward direction.

The method further including:

in (c), gate 32 being a linearly translating gate which linearly moves from the coarse shred position to the fine shred position; and, in (e), linearly positioning gate 32.

Dual shredding system 20 can include the following features and embodiments:

The shred size produced by second shredder 26 is smaller and more consistent than that which exists in the market today.

The combination of equipment is all driven by hydraulics with the ability to very component speeds.

The programming to control the equipment will optimize the throughput of the low speed high torque first shredder 24 as well as the second shredder 26. The loads on second shredder 26 are monitored. When the load becomes high first shredder 24 will stop or slow down and conveyor 30 will also stop or slow the feed down. When the load is low on second shredder 26, the feed rates will increase.

A hydraulic transducer will be used to determine the second shredder 26 load so the optimum feed rates can be programmed into the logic rather than just on and off type inputs and outputs.

By using first shredder 24 ahead of the second shredder the size and weight of second shredder 26 can be reduced while improving its efficiency.

Second shredder 26 has various screen sizes which will allow users to adjust the desired shred size and throughput.

Second shredder 26 can include a flywheel due to low inertia (high power to weight ratio) of the hydraulic drive.

The transfer of material from first shredder 24 to second shredder 26 is provided by a screw conveyor 30 as opposed to a belt conveyor.

Second conveyor 38 is used for compaction.

The system can operate without screen 34 to achieve higher throughput with lower shredding security levels.

The hydraulic system permits maximum diversion of available power to second shredder 26 when screen 34 is not being used to increase system throughput. Or if screen 34 is being used, the diversion of power to second shredder 26 is proportional to the size of the holes in screen 34. That is, larger holes permit a greater diversion of power, and therefore greater throughput. In a mobile application there is only so much power available and the system will maximize the equipment's potential.

Users can bypass second shredder 26 "on the fly" and produce a larger shred size with high throughput.

The users can offer shredding services with different price levels and security levels.

The embodiments of the dual shredding system and method described herein are exemplary and numerous modifications, combinations, variations, and rearrangements can be readily envisioned to achieve an equivalent result, all of which are intended to be embraced within the scope of the appended claims. Further, nothing in the above-provided discussions of the dual shredding system and method should be construed as limiting the invention to a particular embodiment or combination of embodiments. The scope of the invention is best defined by the appended claims.

I claim:

1. A dual shredding system for a mobile document shredding vehicle, the mobile document shredding vehicle having a shredded material storage compartment, the dual shredding system receiving unshredded material and producing ether coarsely shredded material or finely shredded material, the dual shredding system comprising:

a first shredder which receives the unshredded material and produces the coarsely shredded material;

a second shredder which receives the coarsely shredded material from said first shredder and produces the finely shredded material;

a shredded material outlet;

a conveyor which moves the coarsely shredded material from said first shredder to a gate;

said at selectively positionable (1) to a coarse shred position in which the coarsely shredded material is routed to said shredded material outlet, and (2) to a fine shred position in which the coarsely shredded material is routed to said second shredder, and after shredding by said second shredder, the finely shredded material is routed to said shredded material outlet;

said shredded material outlet disposed adjacent to the shredded material storage compartment; and, a second conveyor for moving the coarsely and finely shredded material from said shredded material outlet to the shredded material storage compartment.

2. A dual shredding system for a mobile document shredding vehicle, the dual shredding system receiving unshredded material and producing either coarsely shredded material or finely shredded material, the dual shredding system comprising:

a first shredder which receives the unshredded material and produces the coarsely shredded material;

a second shredder which receives the coarsely shredded material from said first shredder and produces the finely shredded material;

a shredded material outlet;

a conveyor which moves the coarsely shredded material from said first shredder to a gate;

said gate selectively positionable (1) to a coarse shred position in which the coarsely shredded material is routed to said shredded material outlet, and (2) to a fine shred position in which the coarsely shredded material is routed to said second shredder, and after shredding by said second shredder, the finely shredded material is routed to said shredded material outlet;

said first shredder having a forward running direction to shred, and an opposite reverse running direction;

said second shredder being hydraulically powered by an hydraulic power line;

an hydraulic pressure sensor connected to said hydraulic power line, said hydraulic pressure sensor measuring hydraulic pressure in said hydraulic power line when said second shredder is shredding;

when said dual shredding is operating with said gate in said fine shred position, and said hydraulic pressure exceeds a predetermined value, for an interval of time said conveyor stopping and first shredder running in said reverse direction; and, after said interval of time has elapsed, said conveyor starting and said first shredder running in said forward direction.

3. A dual shredding system for a mobile document shredding vehicle, the mobile document shredding vehicle having a machinery compartment which houses the dual shredding system, the machinery compartment separated from a shredded material storage compartment by a barrier wall, the dual shredding system receiving unshredded material and producing either coarsely shredded material or finely shredded material, the dual shredding system comprising:

a first shredder which receives the unshredded material and produces the coarsely shredded material;

a second shredder which receives the coarsely shredded material from said first shredder and produces the finely shredded material;

a shredded material outlet;

a conveyor which moves the coarsely shredded material from said first shredder to a gate;

said gate selectively positionable (1) to a coarse shred position in which the coarsely shredded material is routed to said shredded material outlet, and (2) to a fine shred position in which the coarsely shredded material is routed to said second shredder, and after shredding by said second shredder, the finely shredded material is routed to said shredded material outlet;

said second shredder being a granulator;

said conveyor being an auger conveyor;

said shredded material outlet disposed adjacent to the shredded material storage compartment;

a second conveyor for moving the coarsely and finely shredded material from said shredded material outlet to the shredded material storage compartment;

when said gate is positioned to said coarse shred position, the coarsely shredded material passing underneath said second shredder, said second shredder including a screen which passes the finely shredded material;

a plurality of different interchangeable said screens which pass different size finely shredded material;

said screen replaceable from the machinery compartment;

a vacuum generator disposed on an opposite side of said screen from said second shredder;

said vacuum generator causing the finely shredded material to be pulled through said screen toward said shredded material outlet; and, said gate being a linearly translating gate which linearly moves from said coarse shred position to said fine shred position.

4. A method for shredding material in a mobile document shredding vehicle, comprising:

(a) providing a mobile document shredding vehicle;

(b) providing unshredded material;

(c) providing a dual shredding system for said mobile document shredding vehicle, said dual shredding system including:

a first shredder which receives said unshredded material and produces coarsely shredded material;

a second shredder which receives said coarsely shredded material from said first shredder and produces finely shredded material;

a shredded material outlet;

a conveyor which moves said coarsely shredded material from said first shredder to a gate; and, said gate selectively positionable (1) to a coarse shred position in which said coarsely shredded material is routed to said shredded material outlet, and (2) to a fine shred position in which said coarsely shredded material is routed to said second shredder, and after shredding by said second shredder, said finely shredded material is routed to said shredded material outlet;

(d) activating said dual shredding system;

(e) positioning said gate to one of said coarse shred position and said fine shred position;

(f) putting said unshredded material into said first shredder;

in (c), said first shredder having a forward running direction to shred, and an opposite reverse running direction;

in (c), said second shredder being hydraulically powered by an hydraulic power line;

in (c) an hydraulic pressure sensor connected to said hydraulic power line, said hydraulic pressure sensor measuring hydraulic pressure in said hydraulic power line when said second shredder is shredding;

in (e), when said dual shredding system is operating with said gate in said fine shred position, and said hydraulic pressure exceeds a predetermined value, for an interval of time said conveyor stopping and said first shredder running in said reverse direction; and, after said interval of time has elapsed, said conveyor starting and said first shredder running in said forward direction.

* * * * *

UNITED STATES PATENT AND TRADEMARK OFFICE

CERTIFICATE OF CORRECTION

PATENT NO. : 8,882,008 B1
APPLICATION NO. : 13/429526
DATED : November 11, 2014
INVENTOR(S) : Peter Viveen It is certified that error appears in the above-identified patent and that said Letters Patent is hereby corrected as shown below:

In the Claims

In column 7, line 18, Claim 1 change "at" to -- gate --
In column 7, line 61, Claim 2 change "stopping and first shredder" to -- stopping and said first shredder --

Signed and Sealed this
Tenth Day of March, 2015

Michelle K. Lee

Michelle K. Lee
*Deputy Director of the United States Patent and Trademark Office*